UNITED STATES PATENT OFFICE 2,447,974

NITROSULFONES

Gerard Dunstan Buckley, Blackley, Manchester, England, assignor to Imperial Chemical Industries Limited, a corporation of Great Britain No Drawing. Application August 14, 1945, Serial No. 610,884. In Great Britain August 31, 1944

4 Claims. (Cl. 260—607)

This invention relates to the manufacture of new nitrosulphones and more particularly it relates to the manufacture of nitrosulphones by interaction of nitroparaffins and certain unsaturated or halogenated sulphones.

According to the invention we provide a process for the manufacture of nitrosulphones which comprises causing a nitroparaffin of the formula RR'CHNO2, wherein R and R' may be hydrogen or substituted or unsubstituted hydrocarbon radicals or R and R' may together form part of a cycloaliphatic ring, to react with a sulphone of the formula R''SO2R''', wherein R'' and R''' are substituted or unsubstituted hydrocarbon radicals at least one of which carries either an ethylenic double bond in a position α:β to the sulphone group or a chlorine or bromine atom in a position β to the sulphone group, in the presence of an alkaline-reacting substance.

The nitroparaffins which may be used are thus those which carry at least one hydrogen atom in an α position to the nitro group. As examples of such nitroparaffins which may be used in the process of the invention there may be mentioned nitroethane, 1-nitropropane, nitromethane, 2-nitropropane, 1-nitrobutane, 2-nitrobutane, 1-nitrohexane, nitroneopentane, 1-nitro-2:2-dimethylbutane, 1-nitrohexadecane, nitrocyclohexane, 2 - nitroethanol, 1 - nitro - 2 - propanol, phenylnitromethane, p-bromophenylnitromethane, p-nitrophenylnitromethane and α-naphthylnitromethane.

The reaction which takes place when an unsaturated sulphone is used is one of addition in which the nitroparaffin residue becomes attached to the doubly linked carbon atom of the unsaturated sulphone which is in the β-position to the sulphone group. Thus where both R and R' are hydrocarbon residues, i. e. not hydrogen, and where the unsaturated sulphone is of the form for example CH2=CHSO2R'' where R'' is a hydrocarbon radical, the reaction may be represented:

RR'CHNO2+CH2=CHSO2R''→
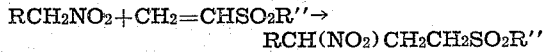
RR'C(NO2)CH2CH2SO2R'' where however one or other or both of R and R' are hydrogen, that is to say there is more than one hydrogen atom attached in an α position to the nitro group, the reaction may lead, especially in presence of an excess of the unsaturated sulphone, to the formation of for example a nitrodisulphone or (when the nitroparaffin is nitromethane) a nitrotrisulphone. Thus, in the above equation, if R' is hydrogen, this becomes:

RCH2NO2+CH2=CHSO2R''→
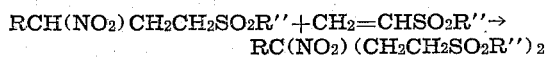
RCH(NO2)CH2CH2SO2R'' and the so-formed nitrosulphone is still a nitroparaffin bearing hydrogen in an α position to the nitro group and in the presence of a further quantity of unsaturated sulphone, it reacts further:

RCH(NO2)CH2CH2SO2R''+CH2=CHSO2R''→
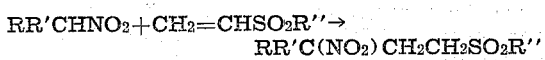
RC(NO2)(CH2CH2SO2R'')2

In such cases both substances are usually formed during the reaction but one or other may be made to preponderate by adjustment of the conditions of reaction.

When a halogenated sulphone is used there may likewise be formed one, two or three products according as neither R nor R' is hydrogen, one of them is hydrogen or both of them are hydrogen.

Unsaturated sulphones which may be used in the process of the invention include for example n-butyl vinyl sulphone, methyl vinyl sulphone, ethyl vinyl sulphone, isopropyl vinyl sulphone, n-butyl vinyl sulphone, isobutyl vinyl sulphone, tert-amyl vinyl sulphone, n-dodecyl vinyl sulphone, n-cetyl vinyl sulphone, phenyl vinyl sulphone, p-tolyl vinyl sulphone, p-chlorophenyl vinyl sulphone, benzyl propenyl sulphone, p-tolyl styryl sulphone, p-methoxyphenyl vinyl sulphone and divinyl sulphone.

Halogenated sulphones which may be used include for example n-butyl β-chloroethyl sulphone, ββ'dichlordiethyl sulphone, β-bromodiethyl sulphone, β-chloroethyl methyl sulphone and p-nitrophenyl β-bromoethyl sulphone.

The reaction is as said carried out in presence of an alkaline-reacting substance. As alkaline-reacting substances which may be used there may be mentioned for example caustic alkalis, for example potassium hydroxide, sodium hydroxide, alkali metal alcoholates for example sodium ethoxide, quaternary ammonium hydroxides for example benzyltrimethylammonium hydroxide and β-hydroxyethyltrimethylammonium hydroxide, and tertiary bases for example pyridine.

The reaction is advisably carried out in a solvent. Suitable solvents include monohydric alcohols for example methanol and ethanol, water, dioxan and ethyleneglycol ethers.

The alkaline-reacting substance may be used in relatively small amount or it may be used in larger amounts for example in an amount stoichiometrically equivalent to the amount of nitroparaffin used. It may be supposed that the presence of the alkaline-reacting substance results in the formation of a salt of the nitro paraffin and it is possible to carry out the reaction by first preparing a salt of the nitroparaffin and bringing this into reaction with the unsaturated sulphone.

The nitrosulphones may be isolated by the conventional means of organic chemistry. They are crystalline substances which are useful as intermediates in the manufacture of dyestuffs and pharmaceuticals.

The invention is illustrated but not limited by the following examples in which parts are by weight:

Example 1

10 parts of a 33% aqueous solution of potassium hydroxide are added to a solution of 35 parts of nitroethane and 150 parts of n-butyl vinyl sulphone in 300 parts of 95% ethanol. The mixture is boiled under reflux for 16 hours. It is then cooled and the crystalline deposit is filtered off, washed and dried. This consists of 3 - nitro - 1:5-di(butanesulphonyl) -3-methylpentane, M. P. 104° C.

Example 2

A solution of 6 parts of potassium hydroxide in 50 parts of methanol is slowly added to an ice-cold solution of 9 parts of 1-nitropropane in 50 parts of methanol. 15 parts of n-butyl vinyl sulphone are then added and the mixture is heated at 50° C. for 6 hours. It is then diluted with 500 parts of water and cooled to 20° C. The crystalline deposit which separates is filtered off washed and dried. It consists of 3-nitro-1:5-dibutanesulphonyl-3-ethyl pentane. The filtrate is acidified by addition of 6.5 parts of glacial acetic acid and is then extracted with ether. The ethereal extract is dried and the ether is distilled. The residual pale yellow oil consists of n-butyl γ-nitroamyl sulphone.

Example 3

72 parts of a 32% solution of sodium hydroxide in water are slowly added to a stirred solution of 45 parts of 1-nitropropane in 150 parts of methanol, the temperature being kept below 20° C. by external cooling. 93 parts of n-butyl β-chloroethylsulphone are then added and the mixture is stirred at 20° C. during 16 hours. It is then poured into a solution of 20 parts of sodium hydroxide in 1000 parts of water. The crystalline deposit which separates is filtered off, washed with cold water and dried. It consists of 3-nitro-1:5-dibutanesulphonyl-3-ethylpentane. The filtrate is acidified by addition of 35 parts of glacial acetic acid and is then extracted with ether. The ethereal extract is dried and the ether is distilled. The residual pale yellow oil consists of n-butyl γ-nitro-n-amylsulphone.

Example 4

1 part of a 33% aqueous solution of potassium hydroxide is added to a solution of 6 parts of nitromethane and 34 parts of methyl vinyl sulphone in 60 parts of 95% ethanol. The mixture is boiled under reflux for 6 hours and is then cooled. The crystalline precipitate, consisting of tris-(β-methanesulphonylethyl) nitromethane, M. P. 214–6° C., is filtered off and dried.

Example 5

10 parts of a 33% aqueous solution of potassium hydroxide is added to a solution of 89 parts of 2-nitropropane and 59 parts of divinyl sulphone in 300 parts of 95% ethanol. The mixture is boiled under reflux for 3 hours, and is then cooled. The crystalline precipitate, consisting of γγ'-dinitro-γγ'-dimethyldibutyl sulphone, M. P. 135° C., is filtered off and dried.

Example 6

63 parts of a 32% aqueous sodium hydroxide solution are added during half an hour to a stirred mixture of 38 parts of nitroethane and 200 parts of water, the temperature being kept at 0–10° C. by means of an icebath. The mixture is then stirred for a further half hour and 75 parts of n-butyl vinyl sulphone are added and the mixture is stirred at 20° C. for 3 hours. Crystals of 3-nitro-1:5-di-(n-butanesulphonyl)-3-methylpentane, identical with the product of Example 1, which separate are moved by filtration. To the filtrate are added 32 parts of glacial acetic acid, and there separates γ-nitrodi-n-butyl sulphone as a pale yellow oil.

Example 7

8 parts of the sodium salt of p-bromophenylnitromethane are dissolved in 80 parts of water at 50° C. and 5 parts of isobutyl vinyl sulphone are added to the solution. The mixture is stirred at 50° C. for 6 hours, cooled, 2 parts of kieselguhr are added and the mixture is then filtered. The filtrate is acidified with 4 parts of glacial acetic acid and the precipitated crystalline material is filtered off. This consists of isobutyl 3-nitro-3-p-bromophenylpropyl sulphone, M. P. 92° C.

Example 8

1 part of a 40% aqueous solution of β-hydroxyethyltrimethylammonium hydroxide is added to a solution of 12 parts of p-bromophenylnitromethane and 16 parts of methyl vinyl sulphone in 80 parts of methanol, and the solution is allowed to stand at 20° C. for 18 hours. The crystalline deposit, consisting of 3-nitro-1:5-di(methanesulphonyl)-3-p-bromophenylpentane, M. P. 135° C., is filtered off and dried.

Example 9

26 parts of nitrocyclohexane followed by 60 parts of p-nitrophenyl β-bromoethylsulphone (obtainable by hydrogen peroxide oxidation of p-nitrophenyl β-bromoethyl sulphide) are added to a solution of 13 parts of potassium hydroxide in 3000 parts of methanol. The mixture is boiled under reflux for 4 hours, and most of the alcohol is then distilled off. The residue is cooled and then treated with 1000 parts of cold water, and the precipitated solid, which consists of p-nitrophenyl β-1-nitrocyclohexylethylsulphone, M. P. 120° C., is filtered off and dried.

I claim:

1. A process for the manufacture of nitrosulphones which comprises mixing in the presence of a strong basic substance a nitroparaffin of the formula RR'CHNO$_2$ wherein R and R' are respectively selected from the group consisting of hydrogen and alkyl radicals, and a sulphone of the formula R$^2$SO$_2$R$^3$ wherein R$^2$ is selected from the group consisting of alkyl radicals, alkylene radicals, and alkyl halide radicals, and wherein R$^3$ is selected from the group consisting of alkylene radicals having an ethylenic double bond in a position α-β to the sulphone group, alkyl bromide radicals having the bromine radical in a position β to the sulphone group, and alkyl chlorides having the chlorine atom in a position β to the sulphone group.

2. A process as described in claim 1, wherein the nitroparaffin is nitroethane and the sulphone is n-butyl vinyl sulphone.

3. A process as described in claim 1, wherein the nitroparaffin is 1-nitropropane and the sulphone is n-butyl vinyl sulphone.

4. A process as described in claim 1, wherein the nitroparaffin is 2-nitropropane and the sulphone is divinyl sulphone.

GERARD DUNSTAN BUCKLEY.

REFERENCES CITED

The following references are of record in the file of this patent:

UNITED STATES PATENTS

| Number | Name | Date |
|---|---|---|
| 2,103,879 | Ufer | Dec. 28, 1937 |

FOREIGN PATENTS

| Number | Country | Date |
|---|---|---|
| 636,077 | Germany | Oct. 5, 1936 |
| 663,992 | Germany | Aug. 20, 1938 |

OTHER REFERENCES

Suter, "Organic Chemistry of Sulfur," pages 725–728, Wiley & Sons (1944).